May 31, 1938. R. MADZAR 2,118,934
ARTIFICIAL TOOTH
Filed April 11, 1935
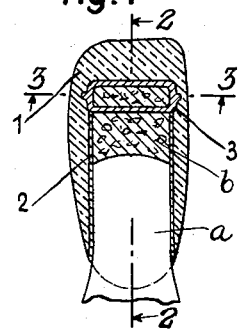
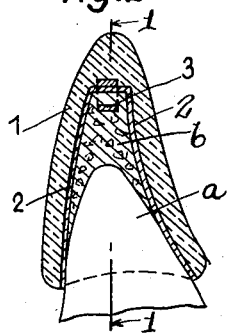
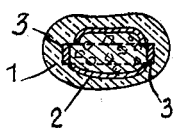
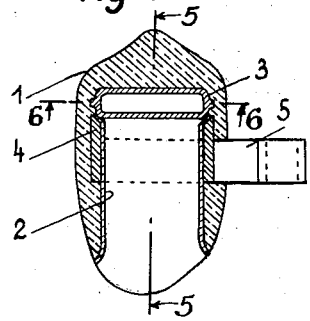
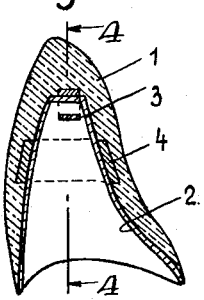
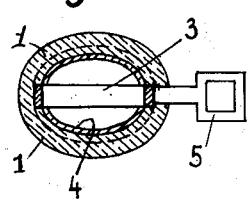
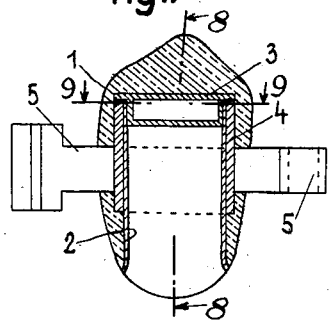
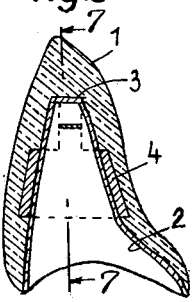
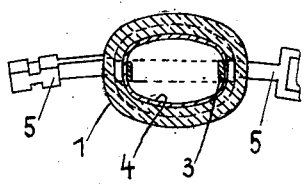
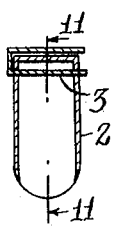
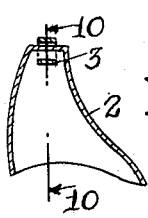
Rudolf Madzar
INVENTOR
his ATT'Y.

Patented May 31, 1938

2,118,934

UNITED STATES PATENT OFFICE 2,118,934

ARTIFICIAL TOOTH

Rudolf Madzar, Vienna, Austria

Application April 11, 1935, Serial No. 15,810
In Austria June 14, 1934

1 Claim. (Cl. 32—12)

This invention relates to crowns and bridge elements, preferably of porcelain, for artificial teeth, and to methods of assembling complete bridges and partial sets of artificial teeth.

Porcelain crowns and bridge elements furnished with metallic parts for attachment to tooth stumps or for the interconnection of individual bridge elements are already known.

In contradistinction to known types, the main feature of the present invention resides in the fact that a hollow metal socket is suitably anchored in the interior of each of the porcelain crowns and bridge elements. This metal socket serves on the one hand to cap the tooth stump and on the other hand to carry the connecting members for the attachment of the adjacent teeth.

The particular construction of the crowns and bridge elements according to the present invention permits of large scale manufacturing, simple mounting on tooth stumps, and the making of a light but rigid connection with the adjacent teeth. In order to be able to cope with every practical contingency, with factory-made elements supplied from stock, the present invention provides a variety of such elements. Examples thereof are the following:

For mounting on tooth stumps:
(1) A plain crown.
(2) A crown with lateral extension piece.
(3) A crown with lateral extension piece and anchoring socket.

For use in assembling bridges:
(4) Solid porcelain tooth with extension piece.
(5) Solid porcelain tooth with anchoring socket.
(6) Solid porcelain tooth with anchoring socket and extension piece.
(7) Solid porcelain tooth with anchoring socket, extension piece, and connecting member.

These examples are only intended to give a skeleton outline of the range of possible variations which can be provided, in accordance with the present invention, for the purpose of meeting all possible needs from a stock of ready made elements.

The invention thus makes it possible for the expensive individual production of porcelain teeth to be dispensed with, and enables the dentist to provide his patients with artificial teeth of high quality, in a simple and inexpensive manner, by the selection of suitable ready made elements, for example from a stock or depôt, in a manner to be described in greater detail in due course.

Forms of construction embodying the invention are shown, by way of example and diagrammatically, in the accompanying drawing, in which:

Figure 1 is a substantially longitudinal sectional view of a porcelain crown for an upper incisor taken on lines 1—1 of Figure 2.

Figure 2 is a substantially longitudinal sectional view of the same taken on lines 2—2 of Figure 1.

Figure 3 is a substantially transverse sectional view taken on lines 3—3 of Figure 1.

Figure 4 is a view corresponding to Figure 1 and showing a lateral extension piece to a supporting hollow metal socket, the section being taken on lines 4—4 of Figure 5.

Figure 5 is a sectional view taken on lines 5—5 of Figure 4.

Figure 6 is a sectional view taken on lines 6—6 of Figure 4.

Figure 7 is a sectional view of a crown showing extension pieces for a combined set comprising a low tooth on the right and a normal tooth on the left; the section being taken on lines 7—7 of Figure 8.

Figure 8 is a sectional view taken on lines 8—8 of Figure 7.

Figure 9 is a transverse sectional view taken on lines 9—9 of Figure 7.

Figure 10 is a longitudinal sectional view of the metal socket and loop taken on lines 10—10 of Figure 11; and Figure 11 is a sectional view taken on lines 11—11 of Figure 10.

The construction of a crown for an upper incisor according to category (1) above, is shown in Figs. 1 to 3. The porcelain crown 1 is cast on a suitably shaped metal socket 2. For the anchoring of the porcelain crown 1 on the metal socket 2 there is provided in the upper portion of the latter an anchoring loop 3 with which the porcelain becomes interlocked during casting, thereby establishing a firm connection between these two parts. The metal socket 2 is shown by itself in Figs. 10 and 11 in which a U-shaped anchoring loop 3 is shown. To insert an artificial tooth in accordance with the present invention, the existing tooth stump $a$ is ground down to fit the metal socket 2. The crown is placed upon the stump as shown in Figures 1 to 3, and the cement $b$ in the socket engages and is received by the holding loop 3 to provide a secure connection between crown and tooth. Before fitting the porcelain crown itself, the dentist first fits a drawn metal tooth which is an exact copy of the porcelain crown, and then uses this metal tooth as a model for any necessary adaptations of the porcelain crown which is then cemented in position. In this manner the porcelain crown is saved from the damage likely to occur in fitting.

Figs. 4 to 6 of the drawing show a porcelain crown according to category (2), provided with an extension piece. This form of construction of the invention enables a bridge to be produced in a simple manner. For this purpose there is attached to the metal socket 2 a holding ring 4 which carries the extension piece 5. The fitting of the crown is effected in the same manner as that described above with reference to Figs. 1 to 3. The extension piece 5 is destined for the reception of a solid porcelain tooth which is cemented in position thereon. An extension piece in the form of a loop, as shown in Figs. 4 to 6, is particularly well suited for teeth of normal length. Figs. 7 to 9 show a canine tooth with vertically disposed extension pieces, on the left for deep and on the right for normal teeth.

The ready made porcelain teeth according to the invention render the use of caoutchouc or gold mounting unnecessary, and both individual teeth and also complete bridges can be invisibly cemented in position. This new method affords considerable advantages, not only from the dentist's point of view as regards treatment, assembly, and fitting, but also from the point of view of the patient as regards expense and the appearance of the finished work.

A further advantage afforded by the invention consists in the fact that the crowns or bridge elements can be readily removed at any time. For this purpose the porcelain crowns are ground down to the metal socket at several points, and can then easily be removed without the slightest danger of injury to the capped tooth. The removal of bridge elements is likewise easily possible by cutting through the connecting members by means of a separating disc or like instrument.

It is advisable to fit a ring of gold or the like over the ground down tooth stump to extend below the gum and to be overlapped by the porcelain crown, as a precaution against the accumulation of remnants of food and consequent harm to the tooth stump.

I claim:

As a new article of manufacture, a factory made artificial tooth adapted to be secured to a tooth stump by means of cement, said tooth comprising a porcelain exterior, a tubular metallic socket contained wholly within said porcelain exterior and a metallic loop of greater diameter than, and positioned at the upper end of, said socket, said loop interlocking with a portion of the porcelain of said porcelain exterior and adapted to receive a quantity of cement used in applying the artificial tooth to a tooth stump, whereby said exterior and socket are anchored to each other and said socket is adapted to be anchored to said stump.

RUDOLF MADZAR.